(12) United States Patent
Feng et al.

(10) Patent No.: US 11,489,351 B2
(45) Date of Patent: Nov. 1, 2022

(54) WIRELESS EARPHONE DEVICE AND METHOD FOR USING THE SAME

(71) Applicant: LUXSHARE PRECISION INDUSTRY COMPANY LIMITED, Shenzhen (CN)

(72) Inventors: Yun Feng, Dongguan (CN); ZhenHua Liu, Dongguan (CN); Yong Huang, Dongguan (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 238 days.

(21) Appl. No.: 16/944,968

(22) Filed: Jul. 31, 2020

(65) Prior Publication Data
US 2021/0296915 A1    Sep. 23, 2021

(30) Foreign Application Priority Data
Mar. 20, 2020 (CN) .......................... 202010199436.3

(51) Int. Cl.
*G06F 17/28* (2006.01)
*H02J 7/00* (2006.01)
(Continued)

(52) U.S. Cl.
CPC ............ *H02J 7/0044* (2013.01); *G06F 40/58* (2020.01); *G10L 15/22* (2013.01); *H04R 1/1016* (2013.01);
(Continued)

(58) Field of Classification Search
CPC ... H02J 7/0044; H04R 1/1016; H04R 1/1041; H04R 1/1025; H04R 2420/07;
(Continued)

(56) References Cited

U.S. PATENT DOCUMENTS

2004/0243392 A1\* 12/2004 Chino ..................... G06F 40/58
704/7
2019/0208324 A1    7/2019 Shmukler et al.

FOREIGN PATENT DOCUMENTS

CN      107333200 A      11/2017
CN      108509428    \*   2/2018 ............. G06F 40/45
(Continued)

*Primary Examiner* — Md S Elahee
(74) *Attorney, Agent, or Firm* — Birch, Stewart, Kolasch & Birch, LLP

(57) ABSTRACT

The present disclosure provides a wireless earphone device and method for using the wireless earphone device. The wireless earphone device comprises a processing unit, a switch unit, a wireless transceiving unit, a language input unit, and a speaker unit. The switch unit is electrically connected to the processing unit. The wireless transceiving unit is electrically connected to the processing unit, transmitting wirelessly with the earphone. The language input unit is electrically connected to the processing unit. The speaker unit is electrically connected to the processing unit. While the earphone charging case is activated and switched to a translation mode by the switch unit, a first voice signal is inputted into the processing unit through the earphone, the processing unit processes the first voice signal into a second voice signal, and the second voice signal is emitted by the speaker unit.

19 Claims, 5 Drawing Sheets

(51) Int. Cl.
*G06F 40/58* (2020.01)
*G10L 15/22* (2006.01)
*H04R 1/10* (2006.01)

(52) U.S. Cl.
CPC ...... *H04R 1/1041* (2013.01); *G10L 2015/225* (2013.01)

(58) Field of Classification Search
CPC ......... G06F 40/58; G06F 40/45; G10L 15/22; G10L 2015/225
USPC .......................................................... 704/2
See application file for complete search history.

(56) References Cited

FOREIGN PATENT DOCUMENTS

| | | | |
|---|---|---|---|
| CN | 108509428 | A | 9/2018 |
| CN | 208353534 | U | 1/2019 |
| CN | 109614628 | A | 4/2019 |
| CN | 110162802 | A | 8/2019 |
| CN | 110245356 | A | 9/2019 |
| JP | 2018-056776 | A | 4/2018 |
| JP | 3225366 | U | 2/2020 |

\* cited by examiner

WIRELESS EARPHONE DEVICE AND METHOD FOR USING THE SAME

CROSS REFERENCE TO RELATED APPLICATION

This application claims the priority benefit of Chinese Patent Application Serial Number CN202010199436.3, filed on Mar. 20, 2020, the full disclosure of which is incorporated herein by reference.

BACKGROUND

Technical Field

The present disclosure relates to the technical field of wireless earphones, particularly to a wireless earphone device with earphone charging case having instant voice translation function and method for using the wireless earphone device.

Related Art

With globalization and the recent improvement of living standards, opportunities for people to travel around the world are greatly increased. During the travel, language is always one of the issues for a satisfying holiday. There are many electric translators available on the market, but they must be carried all the time, which is quite inconvenient in use.

SUMMARY

Since it is a trend that a large number of people are wearing wireless earphones these days, the charging case of the earphone must be carried with. The embodiments of the present disclosure provide an earphone charging case provided with programs capable of translation. The earphone charging case often carried by users can be used to deal with the need for translation without carrying extra translators.

The present disclosure provides a wireless earphone device comprising an earphone for wirelessly transmitting and receiving a sound signal and an earphone charging case for accommodating the earphone, which comprises a processing unit, a switch unit, a wireless transceiving unit, a language input unit, and a speaker unit. The switch unit is electrically connected to the processing unit. The wireless transceiving unit is electrically connected to the processing unit, transmitting wirelessly with the earphone. The language input unit is electrically connected to the processing unit. The speaker unit is electrically connected to the processing unit. While the earphone charging case is activated and switched to a translation mode, a first voice signal is inputted into the processing unit through the earphone, the processing unit processes the first voice signal into a second voice signal, and the second voice signal is emitted by the speaker unit. Or while the earphone charging case is activated and switched to a translation mode, a third voice signal is inputted into the processing unit through the language input unit, the processing unit processes the third voice signal into a fourth voice signal, and the fourth voice signal is transmitted to the earphone through the wireless transceiving unit. The first voice signal and the fourth voice signal correspond to a first human language. The second voice signal and the third voice signal correspond to a second human language.

In the embodiments of the present disclosure, a first human language can be bidirectionally translated between a second human language by using the often-carrying earphone charging case and earphone while the translation is performed by the software installed in the earphone charging case and by the cloud server to which the voice signals are transmitted without any extra translating devices.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
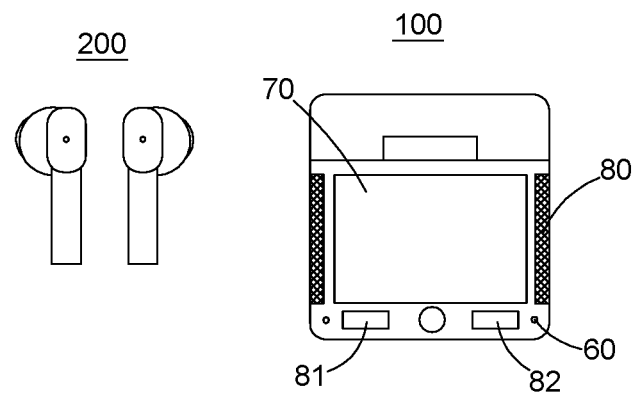
FIG. 1 is a front view of a wireless earphone device (including an earphone charging case and an earphone) of the first embodiment of the present disclosure.

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

In the following embodiment, the same reference numerals are used to refer to the same or similar elements throughout the disclosure.

Figure 2:
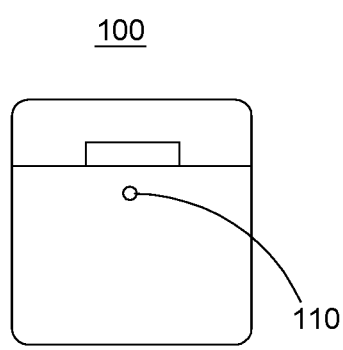
FIG. 2 is a rear view of the earphone charging case of the first embodiment of the present disclosure.
Figure 3:
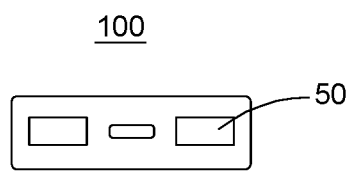
FIG. 3 is a bottom view of the earphone charging case of the first embodiment of the present disclosure.
Figure 4:
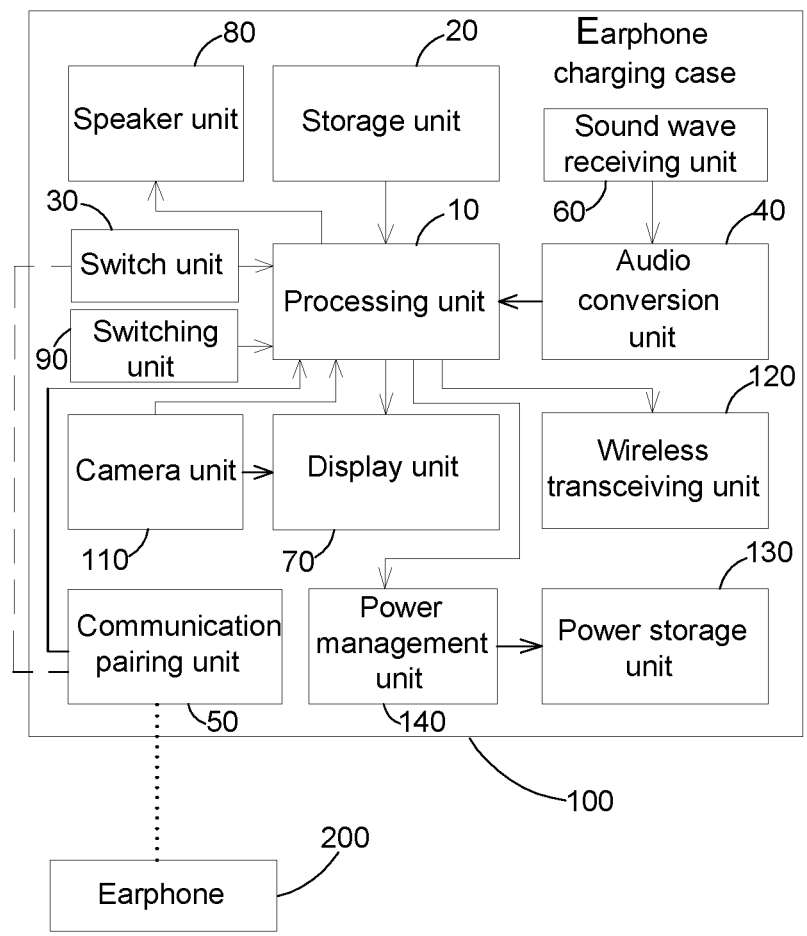
FIG. 4 is a system block diagram of the earphone charging case of the first embodiment of the present disclosure.

FIG. 1 is a front view of a wireless earphone device of the first embodiment of the present disclosure. FIG. 2, FIG. 3 and FIG. 4 are rear view, bottom view, and system block diagram of the earphone charging case of the first embodiment of the present disclosure. As shown in the figure, this embodiment provides a wireless earphone device comprising an earphone charging case 100 and an earphone 200. The earphone 200 transceives sound signals wirelessly. The earphone charging case 100 accommodates the earphone 200. The earphone charging case 100 comprises a processing unit 10, a storage unit 20, a switch unit 30, and an audio conversion unit 40. The storage unit 20 is electrically connected to the processing unit 10 and stores application programs. The switch unit 30 is electrically connected to the processing unit 10. After the switch unit 30 is triggered, it transmits a control signal to the processing unit 10. The audio conversion unit 40 is electrically connected to the processing unit 10, and converts the received sound wave into a first voice signal. After receiving the control signal, the processing unit 10 loads the application program from the storage unit 20, executes the application program, and converts the first voice signal into a character signal and a second voice signal. The first voice signal corresponds to the first human language. The second voice signal and the character signal correspond to the second human language.

In this embodiment, the processing unit 10 could be a processor chip, and the storage unit 20 could be an internal memory or an external memory. An application program for translation is stored in the storage unit 20. The switch unit 30 may be a complementary metal-oxide-semiconductor (CMOS) switching circuit or other forms of switching circuits. The switch unit 30 may comprise mechanical switches. After the switch unit 30 is triggered, a control signal is transmitted to the processing unit 10. For example, after the button is pressed, the switch unit 30 is turned on, so that the high-level power enables the processor chip to make the earphone charging case 100 switched to a translation mode from a charging mode. The switch unit 30 may also be connected to a communication pairing unit 50. Other electronic devices (such as another earphone charging case 100 or a smartphone) send a trigger signal to the switch unit 30 through the communication pairing unit 50 to activate the switch unit 30 and transmit a control signal to the processing unit 10, so as to have the earphone charging case 100 enter the translation mode from the charging mode. The communication pairing unit 50 may comprise chips and electronic components applying various communication protocols, such as near field communication technology (NFC) or Bluetooth technology chips. As shown in FIG. 3, the communication pairing unit 50 may be provided at the bottom of the earphone charging case 100. In this embodiment, the communication pairing unit 50 could be integrated with a wireless transceiving unit 120 into one unit to transceive wireless signals.

The earphone charging case 100 further comprises a sound wave receiving unit 60 comprising a microphone receiving voice of human speaking. In this embodiment, as shown in FIG. 1, the sound wave receiving unit 60 is disposed below the front surface of the earphone charging case 100. The sound wave receiving unit 60 comprises an audio conversion unit 40 converting the sound wave received by the sound wave receiving unit 60 into a first voice signal. The audio conversion unit 40 may include a digital-to-analog converter, which converts the analog signal generated by the sound wave receiving unit 50 (microphone) receiving the sound wave to a digital signal (first voice signal). When the processing unit 10 receives the control signal of the switch unit 30, as described above, the earphone charging case 100 enters the translation mode, and the processing unit 10 would load the application program for translation from the storage unit 20. When speaking in the first human language, the audio conversion unit 40 converts the sound wave of the first human language received by the sound wave receiving unit 60 into a first voice signal. The translation application would first perform voice recognition on the first voice signal, and after obtaining the voice recognition result, a first character corresponding to the voice recognition result would be extracted from the voice text database, the second character (character signal) corresponding to the first character is extracted from the language database, and the application program converts the second character into a second voice signal. The second character and the second voice signal correspond to the second human language. The first human language is, for example, Chinese, and the second human language is, for example, English. The second voice signal is transmitted to the earphone 200 for playback. The second voice signal could be transmitted to the earphone 200 through the communication pairing unit 50 for playback. In another embodiment, the earphone 200 may include a sound wave receiving unit 60. After receiving the sound wave, the sound wave receiving unit 60 transmits the sound wave to the earphone charging case 100 through the communication pairing unit 50, and the audio conversion unit 40 converts the sound wave received by the sound wave receiving unit 60 to the first voice signal. In this embodiment, the earphone could be a pair of Bluetooth wireless earphones with a speaker and a microphone.

In another embodiment, after receiving the first voice signal, the sound wave receiving unit 60 of the earphone transmits the first voice signal to the earphone charging case 100, and the first voice signal is converted into a second voice signal by the processing unit 10 in the earphone charging case 100. After the sound wave receiving unit 60 of the earphone charging case 100 receives a third voice signal, the processing unit 10 converts the third voice signal into a fourth voice signal. The first voice signal and the fourth voice signal correspond to the first human language. The second voice signal and the third voice signal correspond to the second human language.

The earphone charging case 100 further comprises a display unit 70 electrically connected to the processing unit 10. The processing unit 10 transmits the character signal (second character) to the display unit 70. The display unit 70 displays characters corresponding to the character signals. The display unit 70 may be a general display screen or a touch screen. As shown in FIG. 1, the display screen or the touch screen of the display unit 70 is disposed on the front surface of the earphone charging case 100. The processing unit 10 can convert the second voice signal or the fourth voice signal into a text signal, and transmit the text signal to the display unit 70. The display unit 70 displays text signals.

The earphone charging case 100 further comprises a speaker unit 80 electrically connected to the processing unit 10. The second voice signal is transmitted to the speaker unit 80 for playback. The speaker unit 80 may include a speaker. As shown in FIG. 1, the earphone charging case 100 of this embodiment comprises a left and a right channel speakers respectively disposed on two opposite side surfaces adjacent to the display screen or the touch screen. On the front surface of the earphone charging case 100, two volume adjustment buttons 81 and 82 are disposed below the display screen or the touch screen. Press the button 81 to decrease the volume, and press the button 82 to increase the volume.

The earphone charging case 100 further comprises a switching unit 90 and a plurality of language databases. The switching unit 90 and the plurality of language databases are electrically connected to the processing unit 10. The switching unit 90 is triggered to send a switching signal to the processor 10. The processor 10 makes the first voice signal and the second voice signal respectively correspond to the first language database and the second language database of the plurality of language databases according to the switching signal. The switching unit 90 could comprise a plurality of switching buttons, each of which correspond to the translation in two languages. For example, the first switching button corresponds to the translation between Mandarin and English, the second switching button corresponds to the translation between Mandarin and German, and the third switching button corresponds to the translation between Mandarin and Japanese. Pressing each switching button of the switching unit 90 would send a different switching signal to the processing unit 10, so when the processing unit 10 executes the translation application program, it could correspond to different language databases.

As described above, the display unit 70 could be a touch screen, so the display unit 70 can be electrically connected to the switch unit 30 and the switching unit 90. The display unit 70 generates a plurality of button images respectively corresponding to the switch unit 30 and the switching unit 90. The translation mode can be started or different language databases can be switched to by touching the corresponding button image on the touch screen. In an embodiment, the translation mode may be an intelligent translation mode or a smart translation mode. For example, the translation application program may adopts machine learning algorithm or AI algorithm.

The earphone charging case 100 further comprises a camera unit 110 electrically connected to the processing unit 10. The camera unit 110 is used for capturing images. The text in the captured image can be recognized by an application program of optical character recognition and can be converted into a third character. The third character can be converted into a fourth character according to different language databases through the aforementioned translation application program. The fourth character can be displayed on the display unit 70, played by the speaker unit 80, or transmitted to the earphone 200 for playback. In addition, the pictures of the image captured by the camera unit 110 can be transmitted to the cloud server through the internet by the wireless transceiving unit 120. The picture can be retrieved by the search engine of the cloud server, and the data related to the picture can be transmitted to the earphone charging case 100 via the internet and displayed on the display unit 70.

After the camera unit 110 captures the image, it transmits the image signal to the processing unit 10. The processing unit 10 retrieves the first text signal of the image signal and processes the first text signal as a fifth voice signal or a second text signal. The fifth voice signal is transmitted to the earphone 200 through the wireless transceiving unit or is played through the speaker unit 80. The display unit 70 displays the second text signal.

The earphone charging case 100 further comprises a power storage unit 130 and a power management unit 140. The power management unit 140 is electrically connected to the processing unit 10. As shown in FIG. 3, a power interface is provided at the bottom of the earphone charging case 100, which can be connected to an external power source to charge the earphone charging case 100. Power from an external power source is stored in the power storage unit 130, and the power management unit 140 can distribute the power to each unit of the earphone charging case 100.

Figure 5:
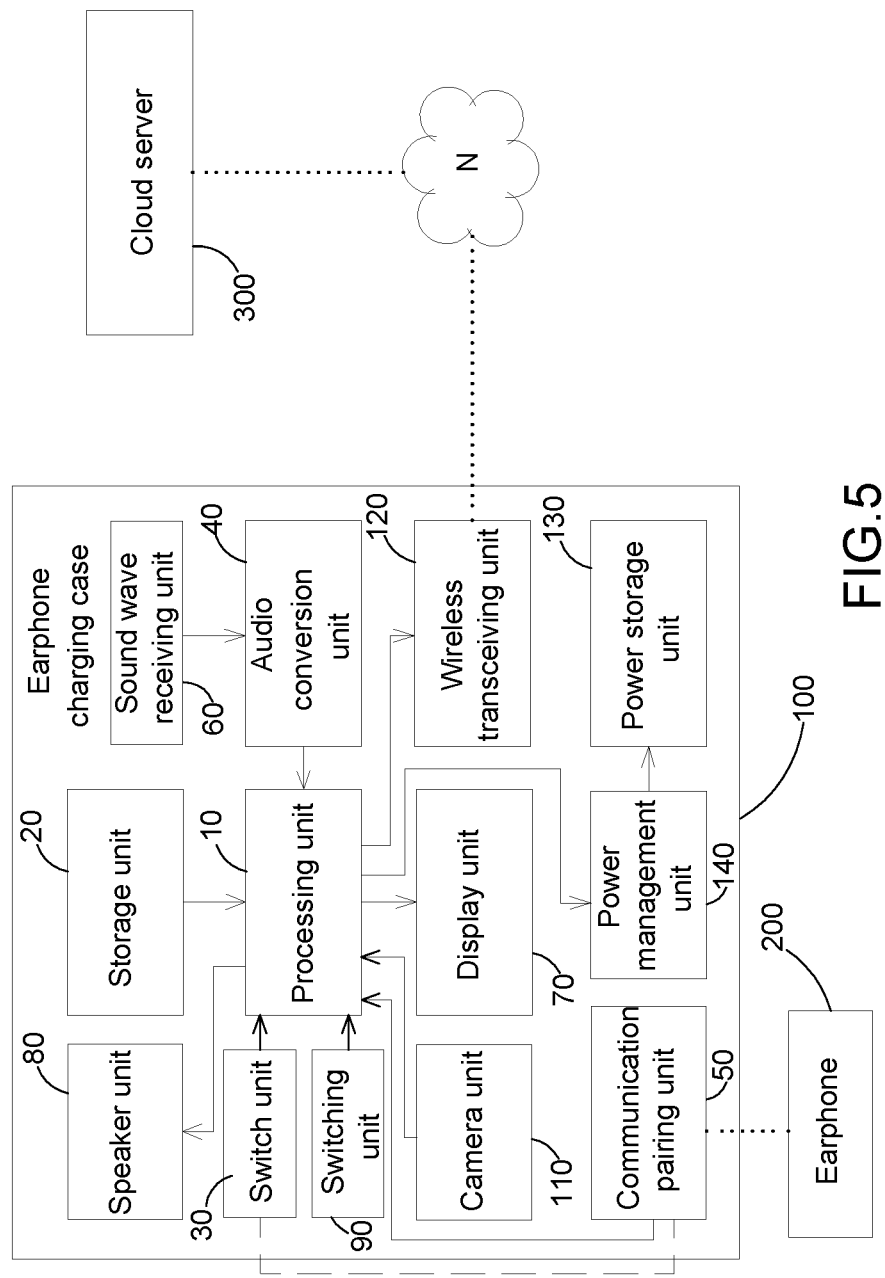
FIG. 5 is a system block diagram of an earphone charging case of the second embodiment of the present disclosure.

FIG. 5 is a system block diagram of an earphone charging case of the second embodiment of the present disclosure. The earphone charging case of this embodiment is substantially identical to the earphone charging case of the first embodiment. The difference between this embodiment and the first embodiment is that the first voice signal of this embodiment is transmitted to the cloud server 300 via the internet through the wireless transceiving unit 120. A translation application program is provided in the cloud server 300, which converts the first voice signal into the first character through the voice recognition as described above, then the first character is converted into the second character and the second voice signal. The second character and the second voice signal are transmitted back to the earphone charging case 100 through the internet N. The processing unit 10 receives and processes the second character and the second voice signal. The second character can be displayed on the display unit 70, and the second voice signal can be played through the speaker unit 80 or transmitted to the earphone 200 for playback.

Figure 6:
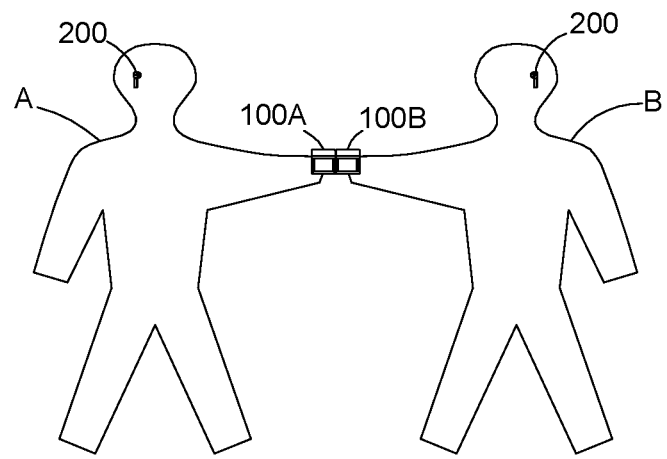
FIG. 6 and FIG. 7 are use state diagrams for both parties that need translation service equipped with the earphone charging case.
Figure 7:
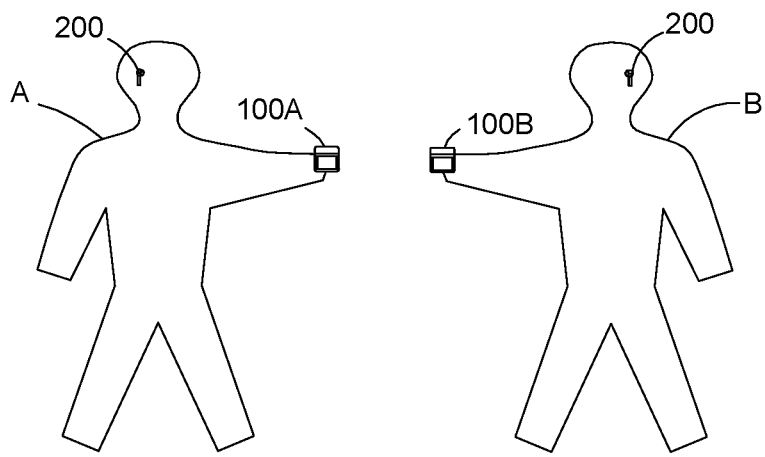

FIG. 6 and FIG. 7 are use state diagrams for both parties that need translation service equipped with the earphone charging case. As shown in the figure, person A has an earphone charging case 100A, person B has an earphone charging case 100B. When both persons A and B need translation, person A holds the earphone charging case 100A and person B holds the earphone charging case 100B, the two cases 100A and 100B are contacted to each other with the communication pairing unit 50 at the bottom of the earphone charging cases. The earphone charging cases 100A and 100B send a trigger signal to the earphone charging cases 100B and 100A, then the 100A and 100B enter the translation mode at the same time. Now, person A and person B can put on earphones 200. Person A speaks the first human language, and person B speaks the second human language. After the earphone charging cases 100A and 100B translate, person A can hear a voice information in the first human language translated from the content that person B speaks played by the earphone. Similarly, person B can hear a voice information in the second human language translated from the content that person A speaks played by the earphone. In this way, persons A and B speaking different languages can conduct two-way communication through the earphone charging case. Therefore, when both parties having an earphone charging case, each one's earphone charging case performs a one-way translation, that is, the earphone charging case 100A only translates the second human language into the first human language and the earphone charging case 100B only translates the first human language into the first human language. In addition, persons A and B can communicated with each other by listening the translated voice information played through the speaker units 80 of the earphone charging cases 100A and 100B or by viewing the translated text information through the display unit 70 of the earphone charging cases 100A and 100B without the earphones 200.

Figure 8:
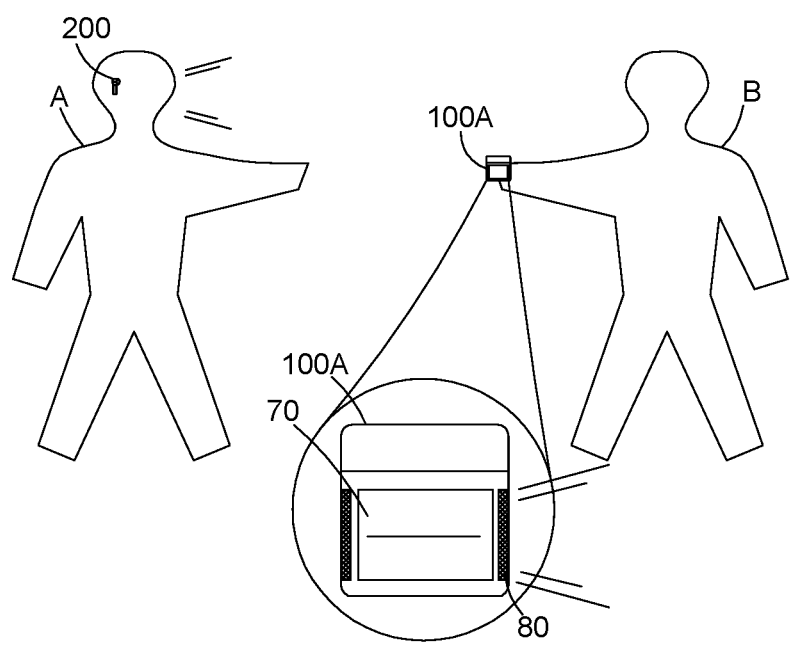
FIG. 8 is a use state diagram for only one of two parties that need translation service equipped with the earphone charging case.

FIG. 8 is a use state diagram for only one of two parties that need translation service equipped with the earphone charging case. As shown in the figure, person A has an earphone charging case 100A, person B has no any earphone charging case. When both A and B need translation, person A triggers the earphone charging case 100A by pressing a button, so that the earphone charging case 100A enters the translation mode. Then the earphone charging case 100A is handed over to person B. Person A speaks the first human language, and person B speaks the second human language. After the earphone charging cases 100A translates, person A can hear a voice information in the first human language translated from the content that person B speaks played by the earphone 200. Person B can hear a voice information in the second human language translated from the content that person A speaks played by the speaker unit of the earphone charging cases 100A. Or, person B can view a translated text message displayed by the display unit 70 of the earphone charging cases 100A.

In summary, the present disclosure proposed a wireless earphone device comprising earphone charging case and earphone. The received voice signals can be translated by using the often-carrying earphone charging case and earphone to play as a voice played by speaker or a text message displayed by display screen while the translation is performed by the software installed in the earphone charging case or by the cloud server to which the voice signals are transmitted without any extra translating devices. The earphone can be used as a voice input and output terminal. It could cooperate with an earphone of another wireless earphone device so that both earphones can be used to speak and listen to the translation voice from the other, which greatly increases the convenience of use.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A wireless earphone device, comprising:
    an earphone for wirelessly transmitting and receiving sound signal; and
    an earphone charging case for accommodating the earphone, the earphone charging case comprising:
        a processing unit;
        a switch unit electrically connected to the processing unit;
        a wireless transceiving unit electrically connected to the processing unit and transmitting wirelessly with the earphone;
        a language input unit electrically connected to the processing unit; and
        a speaker unit electrically connected to the processing unit;
        wherein while the earphone charging case is activated and switched to a translation mode by the switch unit, a first voice signal is inputted into the processing unit through the earphone, the processing unit processes the first voice signal into a second voice signal, and the second voice signal is emitted by the speaker unit; or while the earphone charging case is activated and switched to a translation mode by the switch unit, a third voice signal is inputted into the processing unit through the language input unit, the processing unit processes the third voice signal into a fourth voice signal, and the fourth voice signal is transmitted to the earphone through the wireless transceiving unit; wherein the first voice signal and the fourth voice signal correspond to a first human language; the second voice signal and the third voice signal correspond to a second human language;
        wherein the earphone charging case further comprises a communication pairing unit, the switch unit is connected to the communication pairing unit, and the communication pairing unit sends a trigger signal to the switch unit to have the earphone charging case automatically enter the translation mode while the communication pairing unit is paired.

2. The wireless earphone device according to claim 1, wherein the processing unit processes the first voice signal or the third voice signal by transmitting the signals to a cloud server through the wireless transceiving unit, converting the first voice signal into the second voice signal or converting the third voice signal into the fourth voice signal by the cloud server, and transmitting the second voice signal or the fourth voice signal to the processing unit.

3. The wireless earphone device according to claim 1, wherein the earphone charging case further comprises a display unit electrically connected to the processing unit; the processing unit converts the second voice signal or the fourth voice signal into a text signal and transmits the text signal to the display unit displaying the text signal.

4. The wireless earphone device according to claim 3, wherein the display unit comprises a touch screen displaying the text signal.

5. The wireless earphone device according to claim 1, further comprising a switching unit and a plurality of language databases; wherein the switching unit and the plurality of language databases are electrically connected to the processing unit; the switching unit is triggered to transmit a switching signal to the processing unit; the processing unit makes the first voice signal correspond to the first language database of the language databases according to the switching signal; the processing unit makes the second voice signal correspond to the second language database of the language databases according to the switching signal; the first language database corresponds to the first human language; the second language database corresponds to the second human language.

6. The wireless earphone device according to claim 3, wherein the earphone charging case further comprises a camera unit capturing images; the camera unit transmits image signals to the processing unit retrieving the first text signal of the image signal; the processing unit processes the first text signal into a fifth voice signal or a second text signal; the fifth voice signal is transmitted to the earphone through the wireless transceiving unit or played through the speaker unit; the display unit displaying the second text signal.

7. A method for using a wireless earphone device according to claim 1, comprising:
pairing and connecting the earphone and the earphone charging case through the wireless transceiving unit;
automatically activating the translation mode of the earphone charging case through sending the trigger signal from the communication pairing unit to the switch unit;
inputting a first voice signal into the processing unit through the earphone; the first voice signal corresponding to a first human language;
processing the first voice signal into a second voice signal corresponding to a second human language by the processing unit; and
transmitting the second voice signal to the speaker unit by the processing unit, the speaker unit emitting the second voice signal; or
inputting a third voice signal into the processing unit through the voice input unit of the earphone charging case; the third voice signal corresponding to the second human language;
processing the third voice signal into a fourth voice signal corresponding to the first human language by the processing unit; and
transmitting the fourth voice signal to the earphone by the processing unit.

8. The method for using a wireless earphone device according to claim 7, further comprising:
processing the first voice signal into a text signal corresponding to the second human language by the processing unit; and
transmitting the text signal to the display unit displaying the text signal by the processing unit.

9. The method for using a wireless earphone device according to claim 7, further comprising:
processing the third voice signal into a text signal corresponding to the first human language by the processing unit; and
transmitting the text signal to the display unit displaying the text signal by the processing unit.

10. The method for using a wireless earphone device according to claim 7, further comprising:
activating the switch unit through the pairing connecting of the earphone and the earphone charging case.

11. The method for using a wireless earphone device according to claim 7, further comprising:
transmitting the first voice signal or the third voice signal to a cloud server through the wireless transceiving unit by the processing unit; and
converting the first voice signal into the second voice signal or converting the third voice signal into the fourth voice signal and transmitting the second voice signal and the fourth voice signal to the processing unit by the cloud server.

12. The method for using a wireless earphone device according to claim 7, wherein the processing unit processes the first voice signal or the third voice signal by transmitting the signals to a cloud server through the wireless transceiving unit, converting the first voice signal into the second voice signal or converting the third voice signal into the fourth voice signal by the cloud server, and transmitting the second voice signal or the fourth voice signal to the processing unit.

13. The method for using a wireless earphone device according to claim 7, wherein the earphone charging case further comprises a display unit electrically connected to the processing unit; the processing unit converts the second voice signal or the fourth voice signal into a text signal and transmits the text signal to the display unit displaying the text signal.

14. A method for using a first wireless earphone device and a second wireless earphone device according to claim 1, comprising:
pairing and connecting the earphone charging case of the first wireless earphone device and the earphone charging case of the second wireless earphone device;
automatically activating the translation mode of the earphone charging cases of the first wireless earphone device and the second wireless earphone device at the same time while the communication pairing unit of the first wireless earphone device and the communication pairing unit of the second wireless earphone device are closed to each other;
inputting a first voice signal into the processing unit of the first wireless earphone device or the second wireless earphone device through the earphone of the first wireless earphone device; the first voice signal corresponding to a first human language;
processing the first voice signal into a second voice signal by the processing unit; the second voice signal corresponding to a second human language; and
transmitting the second voice signal to the earphone of the second wireless earphone device by the processing unit; or
inputting a third voice signal into the processing unit of the first wireless earphone device or the second wireless earphone device through the earphone of the second wireless earphone device; the second voice signal corresponding to a second human language;
processing the third voice signal into a fourth voice signal by the processing unit; the fourth voice signal corresponding to a first human language; and
transmitting the fourth voice signal to the earphone of the first wireless earphone device by the processing unit.

15. The method according to claim 14, further comprising:
processing the first voice signal into a text signal by the processing unit; the text signal corresponding to the second human language; and
transmitting the text signal to the display unit of the second wireless earphone device by the processing unit; the display unit displaying the text signal; or
processing the third voice signal into a text signal by the processing unit; the text signal corresponding to the first human language; and
transmitting the text signal to the display unit of the first wireless earphone device by the processing unit; the display unit displaying the text signal.

16. The method according to claim 14, further comprising:
   activating the switch unit through the pairing connection of the earphone charging case of the first wireless earphone device and the earphone charging case of the second wireless earphone device.

17. The method according to claim 14, further comprising:
   transmitting the first voice signal to the cloud server through the wireless transceiving unit by the first wireless earphone device, or transmitting the third voice signal to the cloud server through the wireless transceiving unit by the second wireless earphone device; and
   converting the first voice signal into the second voice signal or converting the third voice signal into the fourth voice signal and transmitting the second voice signal or the fourth voice signal to the processing unit by the cloud server.

18. The method according to claim 14, wherein the processing unit processes the first voice signal or the third voice signal by transmitting the signals to a cloud server through the wireless transceiving unit, converting the first voice signal into the second voice signal or converting the third voice signal into the fourth voice signal by the cloud server, and transmitting the second voice signal or the fourth voice signal to the processing unit.

19. The method according to claim 14, wherein the earphone charging case further comprises a display unit electrically connected to the processing unit; the processing unit converts the second voice signal or the fourth voice signal into a text signal and transmits the text signal to the display unit displaying the text signal.

\* \* \* \* \*